(12) United States Patent  
James

(10) Patent No.: US 6,329,091 B1
(45) Date of Patent: Dec. 11, 2001

(54) FUEL REFORMER SYSTEM FOR A FUEL CELL

(75) Inventor: Brian David James, Alexandria, VA (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/549,397

(22) Filed: Apr. 14, 2000

(51) Int. Cl.$^7$ ............................................. H01M 8/04
(52) U.S. Cl. .................................. 429/19; 429/17
(58) Field of Search ........................ 429/12, 13, 17, 429/19

(56) References Cited

U.S. PATENT DOCUMENTS

| | | |
|---|---|---|
| 4,048,383 | 9/1977 | Clifford . |
| 4,175,153 | 11/1979 | Dobo et al. . |
| 4,200,682 | 4/1980 | Sederquist . |
| 4,240,805 | 12/1980 | Sederquist . |
| 4,268,278 | 5/1981 | Dobo et al. . |
| 4,293,315 | 10/1981 | Sederquist . |
| 4,329,157 | 5/1982 | Dobo et al. . |
| 4,338,167 | 7/1982 | Divisek et al. . |
| 4,642,272 | 2/1987 | Sederquist . |
| 4,664,761 | 5/1987 | Zupancic et al. . |
| 4,795,536 | 1/1989 | Young et al. . |
| 4,797,185 | 1/1989 | Polak et al. . |
| 4,810,485 | 3/1989 | Marianowski et al. . |
| 4,816,353 | 3/1989 | Wertheim et al. . |
| 4,911,803 | 3/1990 | Kunz . |
| 5,156,925 | 10/1992 | Lapp . |
| 5,256,172 | 10/1993 | Keefer . |
| 5,429,885 | 7/1995 | Stockburger . |
| 5,470,680 | 11/1995 | Loutfy et al. . |
| 5,478,662 | 12/1995 | Strasser . |
| 5,612,012 | 3/1997 | Soma et al. . |
| 5,686,196 | * 11/1997 | Sing et al. .......................... 429/17 |
| 5,763,113 | 6/1998 | Meltser et al. . |
| 5,861,137 | 1/1999 | Edlund . |
| 5,928,614 | 7/1999 | Autenrieth et al. . |

FOREIGN PATENT DOCUMENTS

| | | |
|---|---|---|
| 0 810 682 A2 | 3/1997 | (EP) . |
| WO94/22176 | 9/1994 | (WO) . |
| WO97/39821 | 10/1997 | (WO) . |
| WO97/43207 | 11/1997 | (WO) . |
| WO97/46482 | 12/1997 | (WO) . |
| WO98/39250 | 12/1997 | (WO) . |
| WO99/15460 | 4/1999 | (WO) . |
| WO99/19456 | 4/1999 | (WO) . |
| WO99/44252 | 9/1999 | (WO) . |
| WO99/46032 | 9/1999 | (WO) . |

* cited by examiner

Primary Examiner—Gabrielle Brouillette
Assistant Examiner—M. Wills
(74) Attorney, Agent, or Firm—Damian Porcari, Esq.

(57) ABSTRACT

An on-board reforming system for a vehicle fuel cell having a pair of hydrogen purification units linked together. The first hydrogen purification unit generates a first hydrogen stream at a first pressure. The second hydrogen purification unit generates a second hydrogen stream at a second pressure. The first hydrogen stream is fed to a metal hydride storage bed for charging thereof. The hydrogen in the metal hydride storage bed is combined with the second hydrogen stream to feed the fuel cell.

20 Claims, 1 Drawing Sheet

FUEL REFORMER SYSTEM FOR A FUEL CELL

TECHNICAL FIELD

The present invention relates generally to a fuel cell and more particularly to a fuel reformer system for a fuel cell that utilizes multiple membrane hydrogen separation devices.

BACKGROUND ART

Fuel cells have recently been developed as an alternative power source, such as for electrical vehicles. A fuel cell is a demand-type power system in which the fuel cell operates in response to the load imposed across the fuel cell. Typically, a liquid hydrogen containing fuel (e.g., gasoline, methanol, diesel, naptha, etc.) serves as the fuel supply for the fuel cell once it is converted to a gaseous stream containing hydrogen. This is accomplished when the hydrogen-containing fuel is passed through a fuel reformer to convert the liquid fuel to a hydrogen gas (10–75% depending on the liquid fuel) that usually contains other passivating gas species such as carbon monoxide, carbon dioxide, methane, water vapor, oxygen, nitrogen, unburned fuel and, in some cases, hydrogen sulfide. The hydrogen is then used by the fuel cell as a fuel.

In many prior art systems, the fuel reformer for reforming a hydrocarbon based fuel into a gaseous reformate stream includes a hydrogen membrane purification unit that consists of a highly perm-selective membrane that preferentially passes hydrogen molecules. In operation, high pressure reformate is flowed past one side of the membrane and lower pressure, normally pure hydrogen, is collected on the other side (permeate) of the membrane. The difference in hydrogen partial pressures across the membrane supplies the driving force for hydrogen separation. The permeate hydrogen pressure should never exceed the reformate hydrogen partial pressure. Further, the higher the permeate pressure, the larger the amount of reformate hydrogen that will exit the membrane separator without passing across to the permeate side.

The pure gaseous hydrogen is, typically conveyed to a metal hydride system that stores gaseous hydrogen and functions as both a hydrogen load leveling device and as a reservoir of hydrogen for use during vehicle start-up (while the hydrocarbon reformer is warming to operating temperature). The metal hydride system serves as a load leveling device by absorbing (storing) hydrogen gas from the reformer/$H_2$ membrane system when reformer output exceeds fuel cell hydrogen consumption and desorbing (delivering) stored hydrogen when reformer output is less than fuel cell consumption. Hydrogen is absorbed into a metal hydride alloy when gas pressure exceeds the hydride equilibrium pressure (for a given temperature) and hydrogen is desorbed from the metal hydride when gas pressure is below the hydride equilibrium pressure. In general, high hydrogen pressure is desired to charge a metal hydride bed and low hydrogen pressure is desired to discharge the bed.

One problem with current reformer fed fuel cell systems is that they are relatively large, heavy and expensive. This is due in part to the existence of contaminants and dilutents (i.e., non-hydrogen gases) in the hydrogen fuel provided to the fuel cell. These contaminants and dilutents cause a relatively significant reduction in the power production per unit weight and volume of the fuel cell.

A further problem with current fuel cell systems is that they typically require a hydrogen compressor in order to increase the hydrogen pressure to the required metal hydride absorption pressure. The inclusion of a hydrogen compressor also adds increased cost and weight to the system.

Additionally, current onboard reformed fuel cell systems have a relatively slow reaction time to start up electric vehicles than it takes for conventional vehicle systems.

SUMMARY OF THE INVENTION

It is therefore an object of the present invention to provide a compact fuel cell power generation system that is more compact than prior systems.

It is a further object of the present invention to provide a fuel cell power generation system with a relatively fast reaction time that allows a metal hydride bed to perform as a load leveling device and a gaseous hydrogen supply for system startup.

It is still a further object of the present invention to provide a fuel cell power generation system with increased system efficiency.

In accordance with the above and other objects of the present invention, an on-board reforming system for a fuel cell is provided. The system includes a first hydrogen purification unit having an inlet for receiving a supply of high pressure reformate and an outlet for expelling permeated hydrogen. The first hydrogen purification unit also includes an exit to allow the non-permeated portion of the supply of high pressure reformate to exit therefrom. A second hydrogen purification unit has an inlet for receiving the non-permeated portion of the supply of high pressure reformate from the exit of the first hydrogen purification unit. The second hydrogen purification unit also includes an outlet for expelling permeated hydrogen.

A metal hydride storage bed is in communication with the outlet of the first hydrogen purification unit to receive expelled permeated hydrogen therefrom. The metal hydride storage bed is in communication with the fuel cell to transfer hydrogen thereto. The fuel cell also receives expelled permeated hydrogen from the outlet of the second hydrogen purification unit.

Additional objects and features of the present invention will become apparent upon review of the drawings and accompanying detailed description of the preferred embodiments.

BEST MODES FOR PRACTICING THE INVENTION

Figure 1:
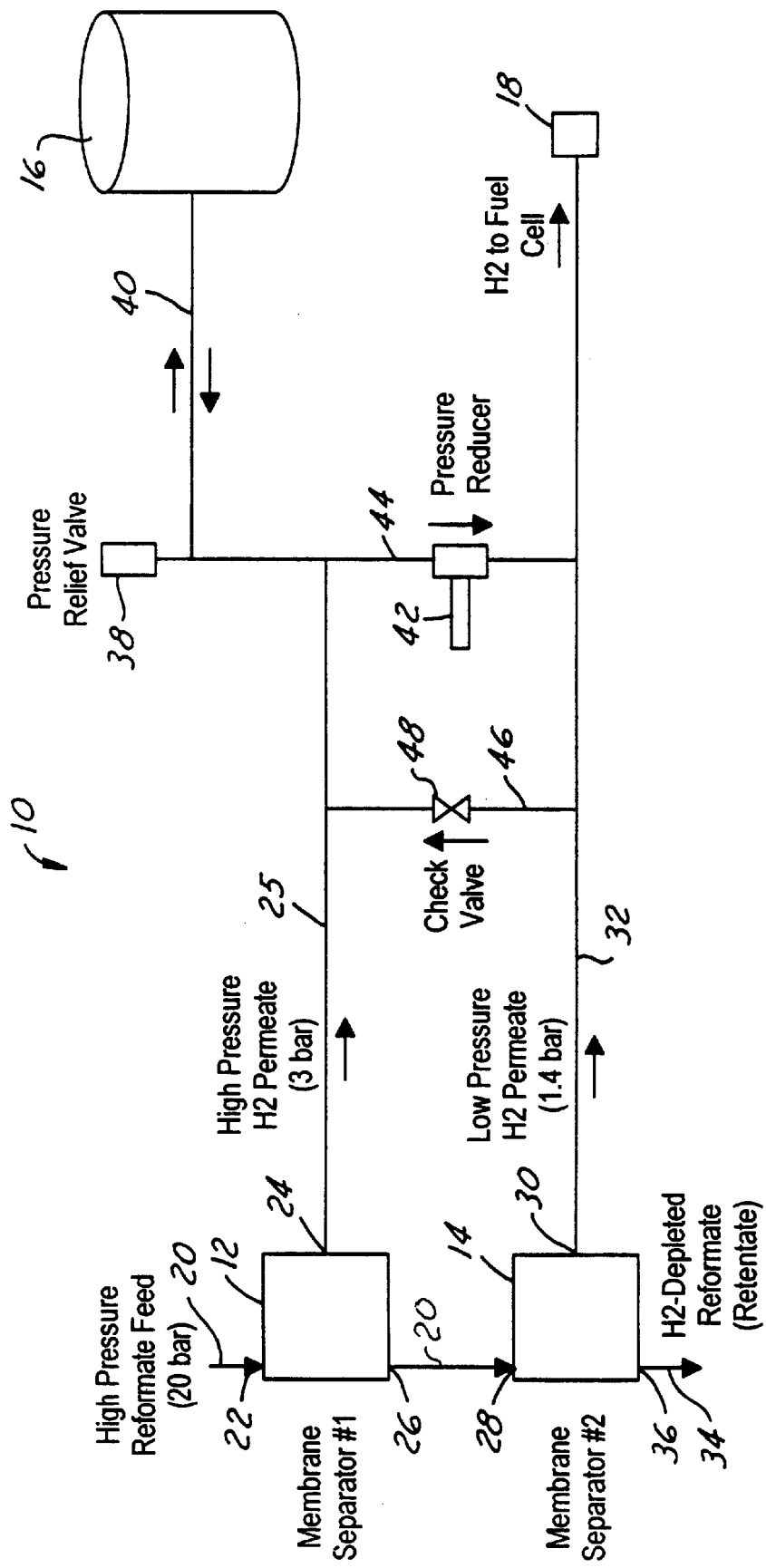
FIG. 1 is a schematic illustration of a fuel reformer system for a fuel cell in accordance with a preferred embodiment of the present invention.

The present invention relates to a fuel reformer system for a fuel cell also referred to as a fuel cell power generation system. The fuel cell is preferably for use in powering an electric vehicle. However, the fuel cell, and the invention disclosed herein, can be utilized in a variety of applications, including both automotive and non-automotive.

The fuel reformer system 10 includes a first hydrogen purification unit 12, a second hydrogen purification unit 14, a metal hydride storage bed 16, and a fuel cell 18. The first and second hydrogen purification units 12 and 14 are preferably membrane purification units consisting of a highly perm-selective membrane that preferentially passes hydrogen molecules. However, a variety of other purification units can be utilized.

The first hydrogen purification unit 12 receives a high pressure reformate feed or stream 20 that enters the first purification unit 12 at an inlet 22 and passes through the first purification unit 12 on one side of a membrane or similar device for purifying or separating the hydrogen from the reformer feed 20 as is well known. The reformate feed 20 preferably consists of a stream consisting of a mixture of hydrogen, carbon dioxide, carbon monoxide, water and a hydrocarbon-based fuel, which preferably is fed to the first purification unit 12 at a pressure of, for example, approximately 20 bar. It should be understood that the stream can be any hydrogen containing gas stream.

The first hydrogen purification unit 12 preferably provides high hydrogen recovery from the reformate feed 20 such that a hydrogen permeate stream exits the purification unit 12 at an outlet 24 on the other side of the membrane (or other device) from where the reformate feed 20 passes. In the preferred embodiment, the hydrogen permeate stream exits the first hydrogen purification unit 12 at a pressure of approximately 2.5–3 bar and is passed into a conduit 25. It should be understood that the reformate feed and hydrogen permeate stream pressures are merely exemplary and can be varied depending upon the system.

The reformate feed 20 exits the first purification unit 12 at an outlet 26 and then enters the second hydrogen purification unit 14 at an inlet 28. The reformate feed 20 enters the inlet 28 and passes through the second purification unit 14 on one side of a membrane or similar device for purifying or separating the hydrogen from the reformate feed 20. The second hydrogen purification unit 14 preferably provides high hydrogen recovery from the reformate feed 20 such that a hydrogen permeate stream exits the purification unit 14 at an outlet 30 on the other side of the membrane (or other device) from where the reformate feed 20 passes. In the preferred embodiment, the hydrogen permeate stream exits the second hydrogen purification unit 14 at a pressure of approximately 1–1.5 bar and is passed into a conduit 32. Similarly, the pressures disclosed for the hydrogen permeate stream are merely exemplary and are not intended to be limiting.

Hydrogen depleted reformate (retentate) 34 exits the second hydrogen purification unit 14 at an outlet 36. The hydrogen permeate that exits the first purification unit 12 passes through a conduit 25, past a pressure relief valve 38, and then through a conduit 40 t o the metal hydride storage bed 16. In accordance with the preferred embodiment, hydrogen permeate at a pressure of approximately 3 bar is passed directly to the metal hydride bed 16 to allow for recharging thereof. The pressure relief valve 38 is preferably set so that if the pressure of the permeate passing to or from the conduit 40 is greater than a preset limit, the relief valve 38 will open in order to reduce the pressure of the permeate.

In operation, the hydrogen permeate that exits the second purification unit 14 passes through a conduit 32 and directly to the fuel cell 18. Thus, the second purification unit 14 feeds hydrogen reformate directly to the fuel cell 18, as needed, at a pressure of approximately 1.5 bar. The second purification unit 14 and the conduit 32, thus function as a metal hydride bed bypass.

In order to provide hydrogen to the fuel cell 18 from the metal hydride storage bed 16, a pressure regulator 42 is disposed in a conduit 44 between the metal hydride storage bed 16 and the fuel cell 18. The permeate hydrogen is stored in the metal hydride storage bed 16 until needed, at a pressure, for example, of 3 bar. In order to charge the fuel cell, the permeate hydrogen is passed from the metal hydride storage bed 16 through the pressure regulator 42. The hydrogen pressure is preferably reduced to the pressure of the permeate hydrogen that is in the conduit 32 for mixing therewith. The use of the pressure regulator 42 also acts to supply a back pressure for the metal hydride bed. Accordingly, in the preferred embodiment, the pressure in the metal hydride storage bed 16 fluctuates between approximately 1.5 bar and 3 bar, depending on whether the bed is charging or discharging and also depending on the rate of charging or discharging.

To obtain a fuel reformer system 10 that is relatively compact in size, a reformate total pressure of 5–20 bar and a permeate pressure of less than or equal to 1 bar is preferred. While various pressure have been disclosed and discussed herein, it should be understood that the actual pressures are not critical to the operation of the invention. It is only critical that during fuel cell hydrogen consumption, the hydrogen permeate pressure expelled from outlet 24 of the first purification unit 12 is higher than the hydrogen permeate pressure expelled from outlet 30 of the second purification unit 14.

The conduit 25 is preferably in fluid communication with the conduit 32 by way of a bypass conduit 46. During periods of zero fuel cell hydrogen consumption, permeate pressure in the conduit 32 will rise in the second purification unit 14. When the permeate pressure of hydrogen expelled from the second purification unit 14 is higher than the permeate pressure of hydrogen expelled from the first purification unit 12, the permeate from the second purification unit 14 will flow through a check valve 48 disposed in the bypass conduit 46, into the metal hydride storage bed thereby charging it. The permeate pressure will rise and metal hydride charging will also occur on system shut-down when fuel cell consumption is zero and some hydrogen resides in the reformate stream.

The apparatus and method of the present invention allows for the use of a single hydride bed for simultaneous storage and discharge of hydrogen to the fuel cell. Further, through the use of a membrane separator with low permeate pressure allows for high recovery of hydrogen from the reformate stream and thus provides high system efficiency. Moreover, the present invention provides for a compact system with fast reaction time that allows the metal hydride bed to perform as a load leveling device and a hydrogen supply for system start up.

Having now fully described the invention, it will be apparent to one of ordinary skill in the art that many changes and modifications can be made thereto without departing from the spirit or scope of the invention as set forth herein.

What is claimed is:

1. An on-board reforming system for a vehicle fuel cell, comprising:
    a first hydrogen purification unit having an inlet for receiving a supply of high pressure reformate and an outlet for expelling permeated hydrogen;
    a second hydrogen purification unit having an inlet for receiving a supply of high pressure reformate and an outlet for expelling permeated hydrogen;
    said expelled permeated hydrogen from said outlet of said second hydrogen purification unit having a lower pressure than said expelled permeated hydrogen from said outlet of said first hydrogen purification unit during hydrogen consumption by the fuel cell;
    a metal hydride storage bed in communication directly with said outlet of said first hydrogen purification unit for receiving expelled permeated hydrogen therefrom;

said metal hydride storage bed being in communication with the fuel cell to transfer hydrogen thereto; and the fuel cell also being in communication with said outlet of said second hydrogen purification unit for receiving expelled permeated hydrogen therefrom.

2. The reforming system of claim 1, wherein said first hydrogen purification unit includes a membrane separator.

3. The reforming system of claim 2, wherein said second hydrogen purification unit includes a membrane separator.

4. The reforming system of claim 1, wherein said first hydrogen purification unit operates within a range of approximately 2.5 to 3 bar permeate pressure which allows recharge of said metal hydride bed.

5. The reforming system of claim 1, wherein said second hydrogen purification unit operates within a range of approximately 1 to 1.5 bar permeate pressure to achieve very high recovery from said supply of high pressure reformate.

6. The reforming system of claim 1, wherein said outlet of said second hydrogen purification unit is in communication with said outlet of said first hydrogen purification unit via a conduit such that when said pressure of hydrogen expelled from said first hydrogen purification unit is lower than the pressure of hydrogen expelled from said second hydrogen purification unit, hydrogen expelled from said second hydrogen purification unit is passed directly to said metal hydride storage bed.

7. The reforming system of claim 6, further comprising a check valve in said conduit to prevent hydrogen expelled from said outlet of said first purification unit from communicating with hydrogen expelled from said outlet of said second purification unit.

8. The reforming system of claim 1, further comprising a pressure reducer disposed between said metal hydride storage bed and the fuel cell.

9. Apparatus for powering a fuel cell, comprising:

a first membrane hydrogen separation device for generating a first hydrogen stream from a gaseous reformate;

a second membrane hydrogen separation device for generating a second hydrogen stream from a gaseous reformate, said second membrane hydrogen separation device in communication with said first membrane hydrogen separation device;

a metal hydride storage system for receiving said first hydrogen stream from said first membrane separation device when said first hydrogen stream pressure is greater than said second hydrogen stream pressure;

the fuel cell in fluid communication with said second hydrogen stream and said metal hydride storage system when said first hydrogen stream pressure is greater than said second hydrogen stream pressure.

10. The apparatus of claim 9, wherein a pressure reducer lowers the pressure of hydrogen from said metal hydride storage bed to approximately equal the pressure of said second hydrogen stream.

11. The apparatus of claim 10, wherein the pressure of said first hydrogen stream is between 2.5 and 3.0 bar.

12. The apparatus of claim 11, wherein the pressure of said second hydrogen stream is between 1.0 and 1.5 bar.

13. The apparatus of claim 12, wherein the pressure of said gaseous reformate is between 5 and 20 bar.

14. The apparatus of claim 9, further comprising a check valve that allows said second hydrogen stream to charge said metal hydride storage bed when said second hydrogen stream pressure is greater than said first hydrogen stream pressure.

15. The apparatus of claim 9, wherein the fuel cell is used in a motor vehicle.

16. A method for charging a fuel cell with hydrogen, comprising:

communicating a high pressure reformate to a first membrane separator;

separating a first hydrogen permeate and expelling said first hydrogen permeate at a pressure that is lower than said high pressure reformate;

communicating said high pressure reformate to a second membrane separator;

separating a second hydrogen permeate and expelling said second hydrogen permeate at a pressure that is lower than said first hydrogen permeate;

charging a metal hydride storage bed with a hydrogen permeate to a pressure that is approximately equal to said pressure of said first hydrogen permeate;

communicating said hydrogen permeate to the fuel cell.

17. The method of claim 16, wherein the fuel cell receives said second hydrogen permeate when said second hydrogen permeate pressure is lower than said first hydrogen permeate pressure.

18. The method of claim 16, further comprising:

reducing said hydrogen permeate pressure as it is communicated from said metal hydride storage bed to the fuel cell.

19. The method of claim 16, wherein said second hydrogen permeate is communicated to said metal hydride storage bed when said second hydrogen permeate pressure is greater than said first hydrogen permeate pressure.

20. The method of claim 16, further comprising relieving the pressure of said hydrogen permeate when the pressure is greater than the pressure of said second hydrogen permeate.

* * * * *